US006711731B2

(12) United States Patent
Weiss (10) Patent No.: US 6,711,731 B2
(45) Date of Patent: Mar. 23, 2004

(54) WEB BASED TOOL CONTROL IN A SEMICONDUCTOR FABRICATION FACILITY

(75) Inventor: Mitchell Weiss, Carlisle, MA (US)

(73) Assignee: Pri Automation, Inc., Billerica, MA (US)

( * ) Notice: Subject to any disclaimer, the term of this patent is extended or adjusted under 35 U.S.C. 154(b) by 45 days.

(21) Appl. No.: 09/935,919

(22) Filed: Aug. 23, 2001

(65) Prior Publication Data

US 2002/0095644 A1 Jul. 18, 2002

Related U.S. Application Data

(60) Provisional application No. 60/227,408, filed on Aug. 23, 2000.

(51) Int. Cl.[7] .......................... G06F 17/50; G06F 19/00
(52) U.S. Cl. .......................... 716/19; 700/95; 700/117; 700/121
(58) Field of Search .......................... 716/19; 700/121, 700/117, 95

(56) References Cited

U.S. PATENT DOCUMENTS

| 5,886,896 | A | * | 3/1999 | Lantz et al. | ................. 700/116 |
| 6,263,255 | B1 | * | 7/2001 | Tan et al. | .................... 700/121 |
| 6,303,395 | B1 | * | 10/2001 | Nulman | ....................... 438/14 |
| 6,393,333 | B1 | * | 5/2002 | Okumura | ..................... 700/114 |
| 6,456,894 | B1 | * | 9/2002 | Nulman | ....................... 700/121 |
| 6,532,427 | B1 | * | 3/2003 | Joshi et al. | .................... 702/84 |
| 2001/0044667 | A1 | * | 11/2001 | Nakano et al. | ............. 700/100 |
| 2002/0002560 | A1 | * | 1/2002 | Shah et al. | ................. 707/200 |
| 2002/0026514 | A1 | * | 2/2002 | Ellis et al. | ................... 709/227 |

OTHER PUBLICATIONS

P. Wilsey, Web–based Analysis and Distributed IP, Proceedings of the 31st Conference on Winter Simulation, pp. 1445–1453, Dec. 1999.*

* cited by examiner

*Primary Examiner*—A. M. Thompson
(74) *Attorney, Agent, or Firm*—Weingarten, Schurgin, Gagnebin & Lebovici LLP; Richard Pickreign (57) ABSTRACT

In brief, the present invention provides a system for the interconnection of semiconductor fabrication tools ("process tools") in a semiconductor fabrication facility by use of a data network and microprocessor based interface ("browser") associated with each process tool. The data network and microprocessor based interface provide communication in accordance with known standards via Intranet or Internet data transfer links to one or more remotely disposed browsers. Data is immediately available in real time on all aspects of the operation of the fabrication facility. Equipment engineers and process engineers can browse the various process tools from any location. Host communications to and from the tools can be monitored without affect on factory operation. The interface is compatible with standard process tools and factory automation or management software systems.

32 Claims, 6 Drawing Sheets

WEB BASED TOOL CONTROL IN A SEMICONDUCTOR FABRICATION FACILITY

CROSS REFERENCE TO RELATED APPLICATIONS

This application claims priority under 35 U.S.C. §119(e) to Provisional Patent Application Serial No. 60/227,408 filed Aug. 23, 2000; the disclosure of which is incorporated by reference.

STATEMENT REGARDING FEDERALLY SPONSORED RESEARCH OR DEVELOPMENT

N/A

BACKGROUND OF THE INVENTION

In a semiconductor wafer fabrication facility, wafers are transported from storage locations to a succession of process stations containing one or more process tools. These process tools perform various processing steps on the wafer during the fabrication of the semiconductor circuits and devices. Communications and control systems are employed within such fabrication facilities for controlling and monitoring tool and system operation and for control monitoring management of operation of the facility and its constituents and the flow of wafers through the facility. Standards have been developed for communications and control of semiconductor equipment. Well known standards include GEM and SECS I and II standards. Although these standards are well known, the standards are typically not implemented uniformly.

The non-uniformity of implementing these standards leads to non-uniform user interfaces. The variations between the user interfaces for various process tools increases the complexity of monitoring and controlling the various processes within the fab. In particular, human error caused by the complex user interfaces can cause large losses both in terms of monetary losses, but the loss of materials, and also in production time and output.

Another problem in increasing the efficiency of the fab plants is the early identification of process problems. Adjusting and correcting the various process "recipes" in a timely manner would greatly increase the efficiency and decrease the costs associated with production. Currently, process data is available through the use of automated test equipment but can be very difficult to use. The SECS communications and data can be monitored, accessing the formats and transmission systems. In addition, process data collected by various automatic test equipment is not integrated together. Process data is typically written to a log file, wherein the data is utilized only after great effort and energy have been expended. The process data is typically not in a standard data format, and often is not in condition to be used without further effort. Good tool status and data is needed to provide complete implementation of fab wide optimization systems.

Therefore, it would be advantageous to provide a method and system that would standardize the user interface for all the various production tools, provide current process data suitable for use with the standard interface, permit the simple connection of any wafer fab process/metrology tool or facility level equipment with the host factory management system, and provide storage for the process data in a useable format suitable for analysis.

BRIEF SUMMARY OF THE INVENTION

In brief, the present invention provides a system for the interconnection of semiconductor fabrication tools ("process tools") in a semiconductor fabrication facility by use of a data network and a microprocessor based interface ("browser") associated with each process tool. The data network and microprocessor based interface provide communication in accordance with known standards via Intranet or Internet data transfer links to one or more remotely disposed browsers. Data is immediately available in real time on all aspects of the operation of the fabrication facility. Equipment engineers and process engineers can browse the various process tools from any location. Host communications to and from the tools can be monitored without affect on factory operation. The interface is compatible with standard process tools and factory automation or management software systems.

Consistent with the present invention, a method and system is disclosed. In one embodiment, an apparatus for monitoring the communications between a fabrication host and a plurality of process tools, wherein a plurality of current process data is obtained and provided for analysis is disclosed. The apparatus includes a plurality of data capture modules corresponding to one of the plurality of process tools. Each of the plurality of data capture modules is coupled both to the fabrication host and to the corresponding process tool and the data transferred therebetween is captured by the data capture module and passed onto the process tool. This data is in a first data format and includes a plurality of current process data. The apparatus further includes a plurality of data translation modules, each one of the plurality of data translation modules coupled to a corresponding one of the plurality of data capture modules. The translation module receives the plurality of current process data and translates this data into a second data format. A plurality of servers, each of the plurality of servers coupled to a corresponding one of the plurality of translation modules. Each of the plurality of servers receives the plurality of current process data. A plurality of web interfaces, each of which is coupled to a corresponding one of the plurality of servers and is also coupled to at least one other web interface. The web interface is configured and arranged to convert the plurality of current process data into a displayable format. At least one web-browser is coupled to at least one of the plurality of web interfaces and display at least a portion of the current process data.

In another embodiment each of the plurality of servers is coupled to at least one other server via a server application network.

In another embodiment each of the plurality of web interfaces is coupled to at least one other web interface via a data network connection, wherein the data network connection is an internet connection.

In another embodiment, the second data format is XML and the displayable format is an HTML page.

In another embodiment the apparatus includes a firewall connected in series between the web interface and the web-based browser.

In another embodiment one or more of the plurality of servers includes a hardware interface to interface with at least one other manufacturing tool.

In another embodiment the apparatus also includes one or more predetermined subscription destinations that have subscribed to receive predetermined process data. The predetermined process data comprises at least a part of the plurality of current data transferred on a data network between a host manufacturing computer and a manufacturing tool. The server further includes a publish/subscription module coupled to the web interface. The publish/ subscription module provides the predetermined process data to the web interface addressed to the one or more predetermined subscription destinations via a data network.

In another embodiment the apparatus includes at least one database coupled to each of the plurality of translation modules. The database stores at least a portion of the plurality of current process data in the second data format. The plurality of data translation modules are coupled to the at least one database server via a database data network.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

Figure 1:
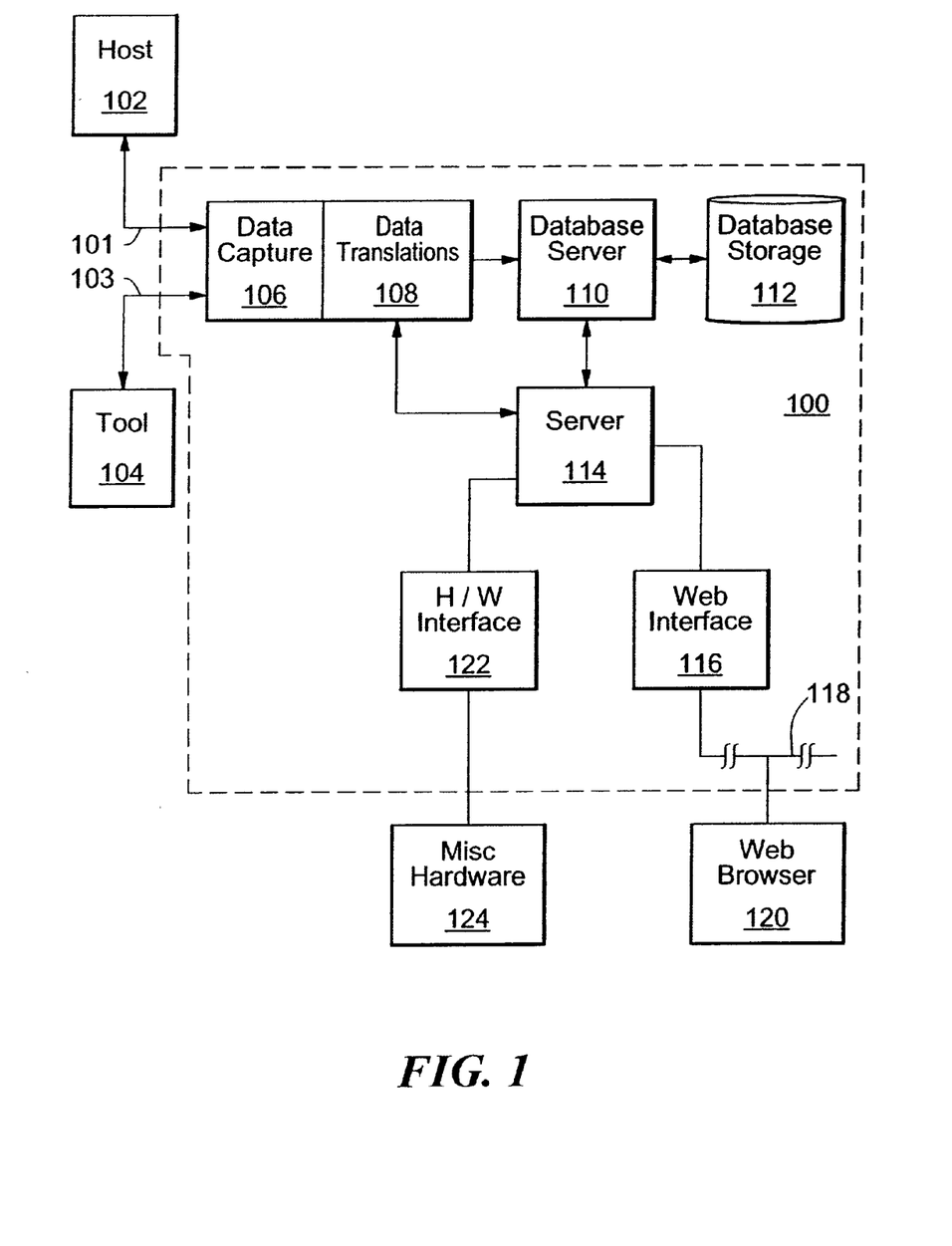
FIG. 1 is a block diagram of the presently described intercommunication and data acquisition system.

FIG. 1 illustrates one embodiment of the web based tool control system described herein. The system 100 includes a data capture module 106 that is coupled to a fabrication host computer 102 and a fabrication process tool 104 via a data networks 101 and 103 respectively. The data capture module 106 monitors and captures communications and the associated process data transferred between the host 102 and the process tool 104. The process data captured by the data capture module 106 is in a first data format, which can be one of a plurality of different data formats. These plurality of data formats are often proprietary formats developed by the various vendors for their particular production/process tools used within the fabrication facility. The data capture module 106 passes the captured process data, in the first data format, to the data translation module 108. The data translation module 108 receives the plurality of process data, in the first data format, and translates this process data into a second data format. The translated process data in the second data format is provided to a data base server 110 and a data base storage unit 112. The data base server 110 configures the translated process data and stores the process data in the database storage unit 112 for later retrieval and analysis by a user. A server module 114 is coupled to both the data translation module 108 and the data base server 110. As such, the server module 114 is able to receive the process data in the second data format from the translation module 108 for use in real time. The server module 114 is further able to access the stored process data via the database server 110 and database storage system 112. This allows a user to perform historical analysis of the data stored therein. In addition, the server module 114 is coupled to a web interface 116 which is further coupled to a data network 118, to which at least one web-based browser 120 is coupled thereto. A user (not shown) operating one of the web-based browsers 120 is therefore able to access the server module 114 and retrieve and analyze both real time and historical data. The server module 114 can also be coupled to a hardware interface 122. The hardware interface 122 provides an interface to miscellaneous hardware 124 for data collection or control.

As depicted in FIG. 1, the host 102, the data capture module 106, and the process tool 104 are shown in a "drop in" configuration. In this configuration all communications between the host 102 and the process tool 104 are passed through the data capture module to analyzed before passing the communication on to the process tool 104.

Figure 2:
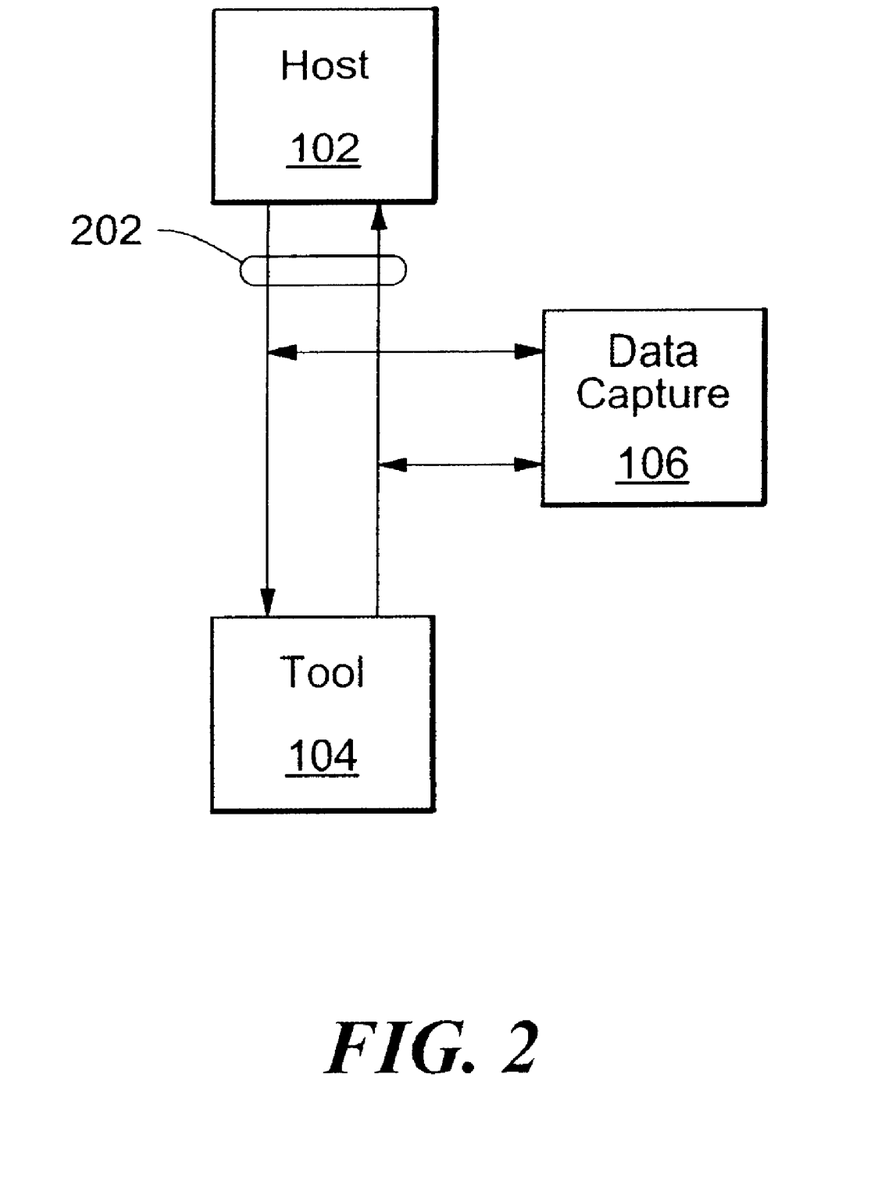
FIG. 2 is a block diagram of one embodiment for connecting the data capture module 202 in the presently described system.

As depicted in FIG. 2 an alternative coupling can be accomplished wherein the host 102 and process tool 104 are coupled via a network 202, which may be an ethernet or other form of intranet or internet connection, and wherein the data capture module 106 monitors the communication lines between the host and the tool without interfering or interruptions with the communication there between.

As noted, the data capture module 106 captures communications and process data that are passed between the host computer 102 and the process tool 104. These communications, for example, can be commands sent from the host to the tool, process data being passed from the host to the tool, process data being passed from the tool to the host, or other data pertinent to the ongoing processing operations. As discussed above, this data or commands may be in a variety of different formats. For example, the communications could be an RS-232 (SECS I) and TCP/IP (HSMS) communication standards as well as SECS II data formats. In general, these data formats are not suitable for use in other applications such as a data base application or a data analysis application.

As noted, the captured process data in the first data format is provided to the data translation module 108. The data translation module receives all of the host/tool data and communications and converts this process data into a second data format. The second data format should be a standard data format that is accessible and usable by a variety of applications. In a preferred embodiment the second data format is a tagged XML format which renders the data accessible to a wide variety of clients and applications. In addition, the data translation module 108 also converts data in the opposition direction, i.e., from a tagged XML format into the first data format used by the host and the tool. In this way, commands or data may be manually passed to the host or tool from the data server 114. In one embodiment the conversion of data from the first data format into the second data format and also from the second data format into the first data format is typically a mulistage process. The actual data conversion is based upon a previously created, expandable infrastructure of dictionary/mappers. This infrastructure is created in a semiautomatic process and accordingly enables the quick and accurate acquisition of new tools.

The data base server 110 and data base storage unit 112 can be a commercial off-the shelf (COTS) data base system that allows the storage of process data translated into the second data format and the retrieval of the translated process data by interested clients. The COTS data base system can be used to filter and analyze the received data to provide trends and statistics such that early detection of production problems may be recognized. The data base is designed to provide a reliable archiving of the received data in a scalable system. In one embodiment the data base is also able to be connected to a data network to provide a wider availability to interested clients.

The server 114 provides real-time process data for tools and applications, wherein the real-time process data is received from either the data translation module 108 or from the data base server 110.

A web interface 116 is coupled to the server 114 to provide an interface between the server and a data network 118. The data network 118 can include an ethernet, an internet or an intranet data communications network that is suitable for use for the type and amount of data to be transferred thereon. A web based server 120 is coupled to the data network 118 to provide communication between a user (not shown) and the server 114.

In one embodiment the server 114 includes a publish/subscription data module (not shown). In this embodiment one or more users subscribe, via the server 114, to receive at a predetermined subscription destination, at least a portion of the process data that has been captured and translated. In this embodiment the publish/subscription module collects and organizes the various process data desired by each of the subscribers and groups the data appropriately. In addition, the publish/subscription module properly formats the process data such that the appropriate data is sent to a predetermined subscription destination that has been previously provided. In general the predetermined subscription destination is a web based browser connected to data network 118. In this embodiment server 114 provides updates on specified variable changes to the registered clients in real-time. In addition, a user operating a web based browser 120 can access via data network 118 and web interface 116 the server 114. In this manner a user is able to request data via the data base server 110 for retrieval and/or analysis of data stored in data base storage 112.

The web interface can include a COTS web server to enable external browser based clients to selectively access and analyze real-time process data contained within the server 114 or historical data stored in the database 110, 112. In addition, a user can provide commands and/or data for a tool or the host via the web interface. This process data, in the second data format, is translated by the translation module 108 and provided to the appropriate destination. The web interface provides server access to various types of browser based clients 120 such as HTML pages, i.e., data displayed on a standard browser which enables quick and standard interfacing of a deployed tool, XML pages which requires the use of XML (extensible style sheet language) that enables and controls the display of XML on the client's browser 120 and Java applets that are downloaded to the web based browser 120 client and enables the presentation and animation of data from a particular tool. The Java applets can be extended to support other manipulation of data on a specific tool, a group of tools, or a data exchange between tools for increased interoperatability.

The web based browser 120 accesses via the data network 118 the web interface 116 and server 114, the process data contained in data base storage 112 by means of generic tools such as SQL, HTML, D/COM, XML and Java. In particular the data based server may include an interface that utilizes SQL or HTML. The server 114 can include an interface using D/COM to allow other users having different communication formats to communicate. External clients accessing the data via a web based browser 120 can use standard protocols to access the data which also may include standard commercial security solutions such as firewalls. In addition the system 100 can support fine granularity definition of access controls lists (ACLs) to achieve maximum security of the data. Web access can also be achieved using wireless web access technology such as microwave or infrared communication links (not shown). The server 114 can be coupled to one or more appropriate interfaces (not shown) to provide the necessary connectivity and coverage. A user (not shown) would be able to access the data via a personal data assistant (PDA), laptop, cell phone or other personal processing equipment or communications device having the necessary wireless microwave or infrared interface, the necessary processing and software capability including a web browser, and the necessary display capability.

Figure 4A:
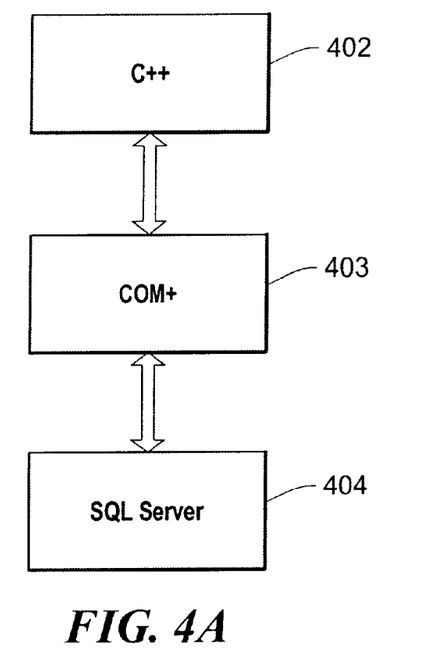
FIGS. 4A–4E are block diagrams of different embodiments of the database server depicted in FIG. 2.
Figure 4B:
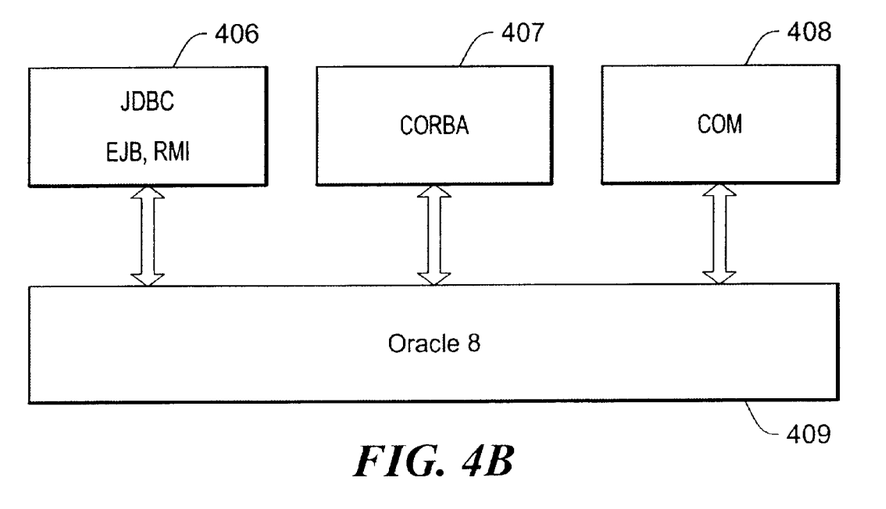
Figure 4C:
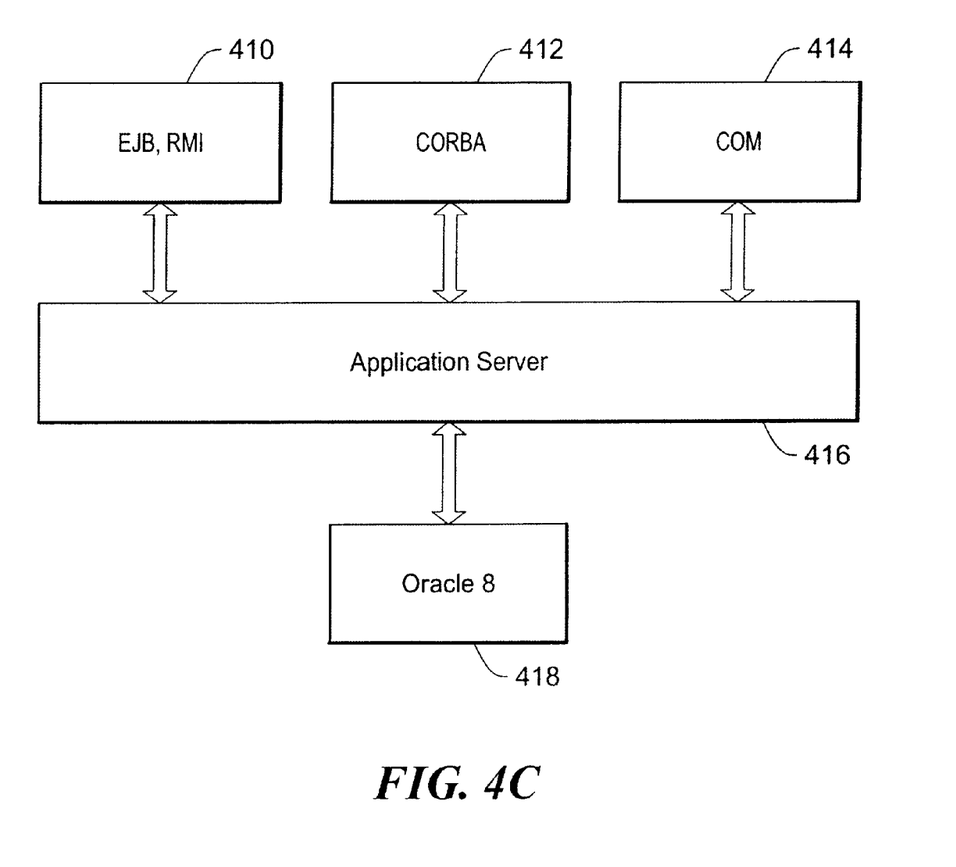
Figure 4D:
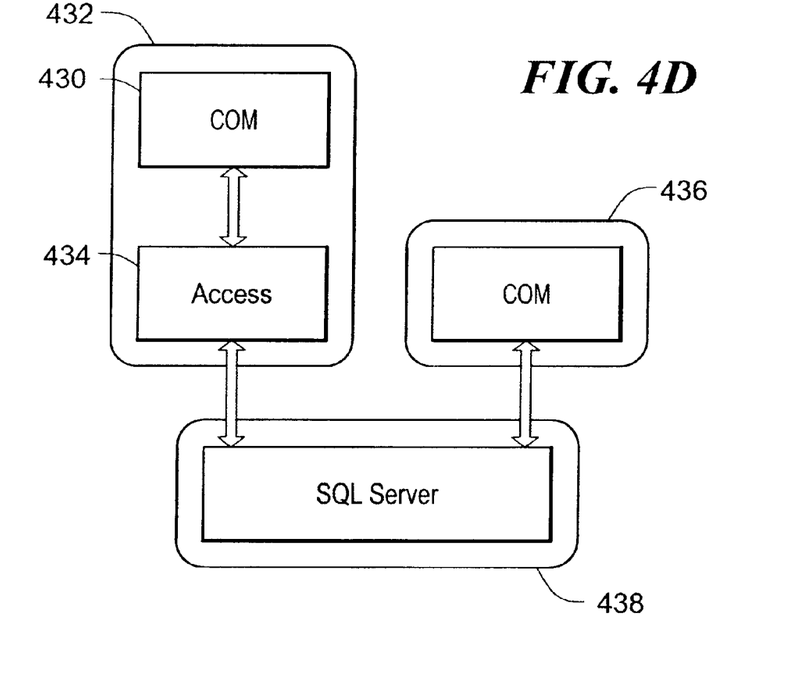
Figure 4E:
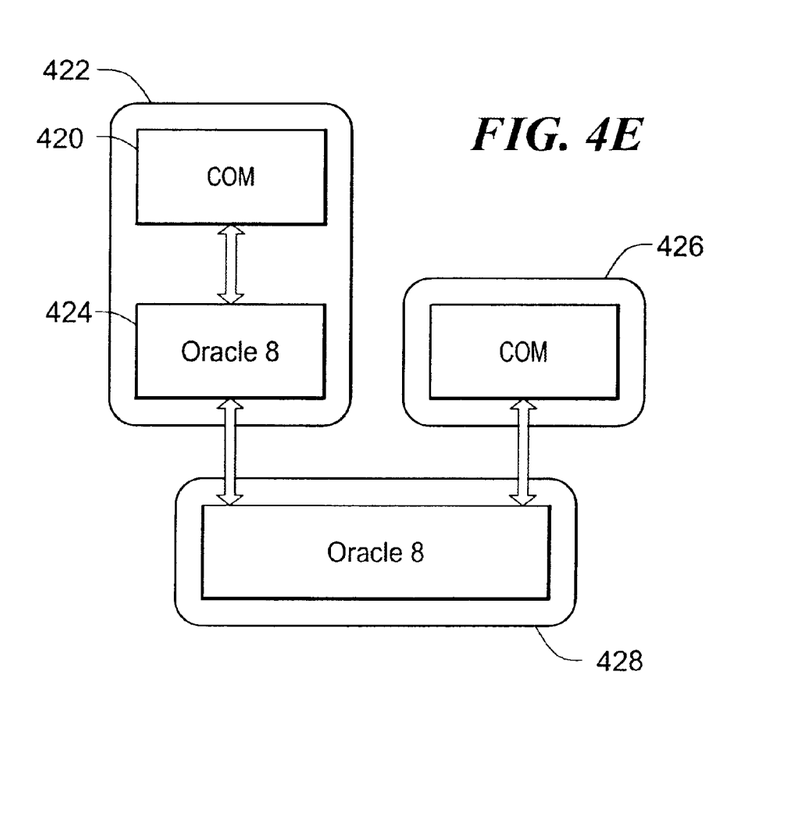

Various architectures can be used for the database system described above. In one embodiment depicted in FIG. 4A a database management system written in C++ communicates over the Microsoft COM or COM+ application that are included in the Windows 2000 operating system. The COM or COM+ system communicate with the SQL server to access the data stored in the database storage unit 112. An Oracle based platform is depicted in FIG. 4B. FIG. 4C depicts an Oracle based platform as in FIG. 4B with the addition of an application server 424. The application server 424 can be a BEA, IBM, Oracle or Sun Application Server. FIG. 4D depicts a rich client SQL platform, wherein part of the processing is handled by the client 428 via Microsoft Access 432. FIG. 4E depicts a rich client Oracle platform, wherein part of the processing is handled by client 438 via Oracle software 442 installed thereon.

Figure 3:
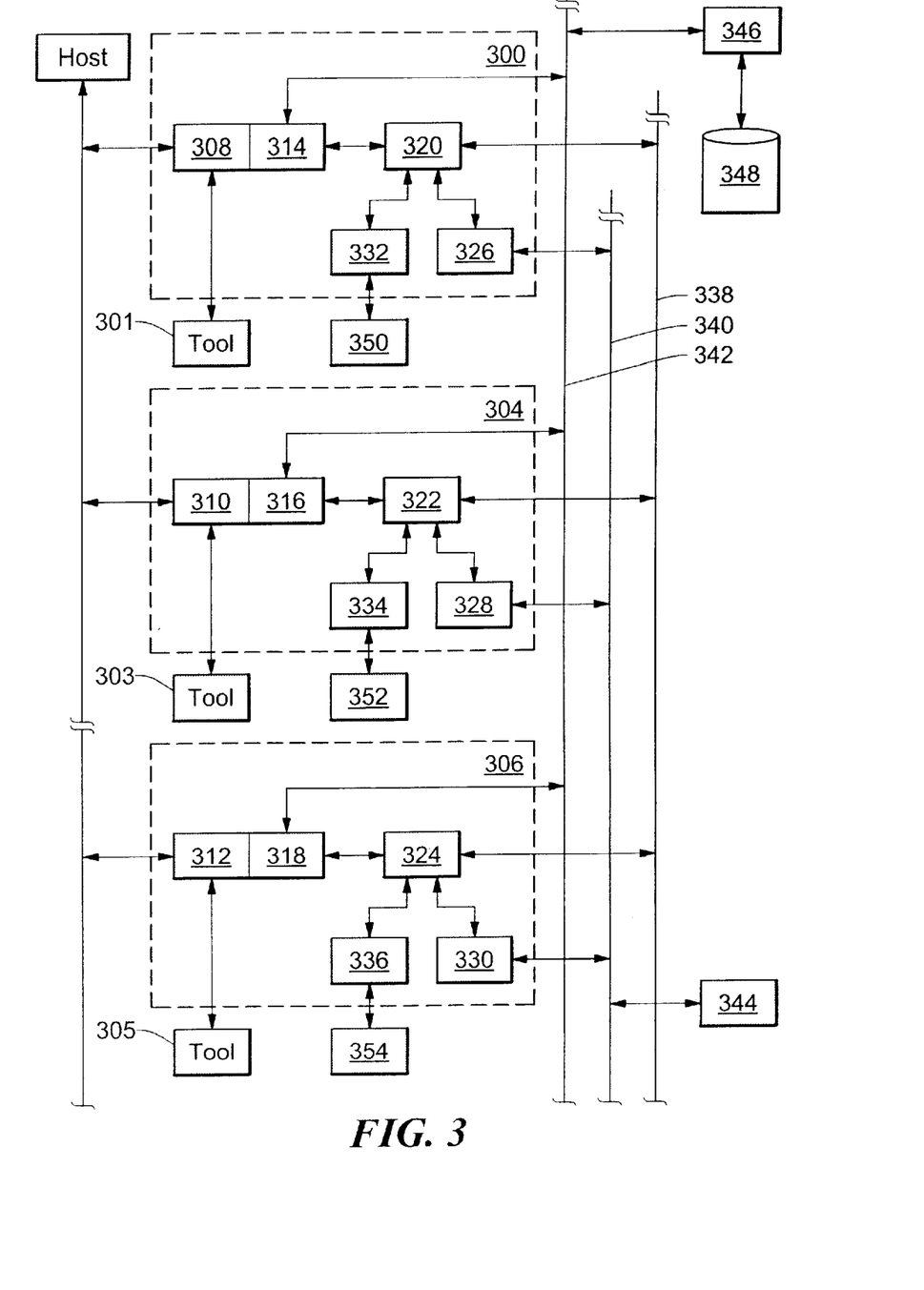
FIG. 3 is a block diagram of the interconnections between the various components of the presently described intercommunication and data acquisition system.

Typically, there are a plurality of production tools connected to the fabrication host computer. As depicted in FIG. 3, each tool has associated therewith a web based tool control system. In particular tool 301 has associated therewith a web based tool control system 302, tool 303 has associated therewith a web based tool control system 304, and tool 305 has associated therewith a web based tool control system 306. Each of the web based tool control systems 302, 304, and 306 include a data capture module 308, 310, and 312 respectively coupled to a data translation module 314, 316, and 318 as described above. Each of the web based tool control systems 302, 304, and 306 also include a server module 320, 322, and 324 respectively. Each server module is coupled to the respective translation module and to a server data line 338. Each server is thus connected to at least one other server such that the servers are able to communicate directly with one another. In one embodiment, the server data line 338 can be a separate data communications channel specifically sized and engineered to support communication between each of the servers. Each of the web based tool control systems 302, 304 and 306 also includes a web interface 326, 328, and 330 respectively. Each of the web interfaces is coupled to the respective server module and further coupled to a web data line 340. In one embodiment the web data line can be an ethernet, an internet, or an intranet that is suitable sized and engineered for the expected data traffic between each of the web interfaces. One or more web based browsers 344 and 346 can be coupled to the web data line 340 in order to provide user access to the system. In addition, each server module 320, 322, and 324 can be coupled to a hardware interface 322, 334, and 336 respectively. The hardware interfaces 332, 334 and 336 provide a data and/or interfaces to miscellaneous hardware 350, 353 and 354. A data base server 346 is coupled to each of the translation modules 314, 316, and 318 in each of the web based tool control systems 302, 304 and 306 respectively. The data based server 346 can be coupled to the plurality of translation modules via a data base data line 342, which can be any data communications line that is sized and engineered appropriately for the expected data traffic thereon. The data based server 346 is further coupled to a data base storage system 348 that stores the selected process data.

In a preferred embodiment the interface is a Windows NT based single board computer with onboard non-volatile memory. The computer supports RS 232 (SECS I) and TCP/IP (HSMS) communications standards as well as SECS II data formats and device net for external add on sensor devices. The computer can operate as a tool data server (TDS) for the process tools. The interface is contained in a small enclosure which can be attached to the tool or tool station. The interface includes ports for input and output connectors and does not require any keyboard or display.

Those of ordinary skill in the art should further appreciate that variations to and modification of the above-described methods and apparatus for providing web based tool control in a semiconductor fabrication facility may be made without departing from the inventive concepts disclosed herein. Accordingly, the invention should be viewed as limited solely by the scope and spirit of the appended claims.

What is claimed is:

1. An apparatus for monitoring the communications between a fabrication host and a plurality of fabrication tools, in a semiconductor fabrication facility, wherein process data is obtained from each of the fabrication tools, the apparatus comprising:
    a plurality of data capture modules, each of the plurality of data capture modules corresponding to one of the plurality of fabrication tools, each of the plurality of data capture modules coupled to the fabrication host and to the corresponding fabrication tool, wherein data transferred between the fabrication host and the corresponding fabrication tool, which is in a first data format and includes a plurality of current process data, is captured by the data capture module and passed onto the fabrication tool;
    a plurality of data translation modules, each one of the plurality of data translation modules coupled to a corresponding one of the plurality of data capture modules, wherein the translation module receives the plurality of current process data, which is in a first data format, and is configured and arranged to translate this current process data into a second data format;
    a plurality of servers, each of the plurality of servers coupled to a corresponding one of the plurality of translation modules and further coupled to at least one other server, wherein each of the plurality of servers receives the plurality of current process data, which is in the second data format;
    a plurality of web interfaces, each of the plurality of web interfaces coupled to a corresponding one of the plurality of servers and further coupled to at least one other web interface, the web interface configured and arranged to convert the plurality of current process data into a displayable format;
    at least one web-browser coupled to at least one of the plurality of web interfaces, wherein the at least one web browser displays at least a portion of the current data transferred between the fabrication host and the corresponding tool in the second data format.

2. The apparatus of claim 1 wherein at least one server includes at least one database server coupled to a database storage device.

3. The apparatus of claim 1 wherein each of the plurality of servers is coupled to at least one other server via a server application network.

4. The apparatus of claim 1 wherein each of the plurality of web interfaces is coupled to at least one other web interface via a data network connection.

5. The apparatus of claim 4 wherein the data network connection is an internet connection.

6. The apparatus of claim 1 wherein the second data format is XML.

7. The apparatus of claim 1 wherein the displayable format is an HTML page.

8. The apparatus of claim 1 further comprising a firewall in series between the web-based interface and the web-based browser.

9. The apparatus of claim 1 wherein the server further includes a hardware interface to interface with at least one other manufacturing tool.

10. The apparatus of claim 1 further comprising one or more predetermined subscription destinations that have subscribed to receive predetermined process data that is a part of the plurality of current process data transferred on a data network between a host manufacturing computer and a manufacturing tool, wherein the server further includes a publish/subscription module coupled to the web interface, wherein the publish/subscription module provides the process data to the web interface to be provided to the one or more predetermined subscription destinations via a data network.

11. The apparatus of claim 3 further comprising at least one database coupled to each of the plurality of translation modules, wherein the plurality of current process data in the second data format is stored in the database.

12. The apparatus of claim 11 wherein the plurality of data translation modules is coupled to the at least one database server via a database data network.

13. The apparatus of claim 1 wherein the server further includes a publish/subscription module coupled to the web interface, wherein the publish/subscription module includes one or more subscription destinations having subscribed to receive predetermined process data and wherein the predetermined process data is provided to the web interface to be provided to the one or more subscription destinations via a data network; and
    further comprising at least one database coupled to each of the plurality of translation modules, wherein the plurality of current process data in the second data format are stored in the database.

14. The apparatus of claim 13 wherein the plurality of data translation modules is coupled to the at least one database server via a database data network.

15. The apparatus of claim 14 wherein the at least one wireless web-browser is coupled to the wireless web interface via an infrared signal.

16. The apparatus of claim 1 wherein at least one of the plurality of web interfaces is a wireless web interface and at least one web-browser is a wireless web-browser coupled to wireless web interface.

17. The apparatus of claim 16 wherein the at least one wireless web-browser is a personal digital assistant.

18. The apparatus of claim 16 wherein the at least one wireless web-browser is a lap-top computer.

19. The apparatus of claim 16 wherein the at least one wireless web-browser is a cellular telephone.

20. The apparatus of claim 16 wherein the at least one wireless web-browser is coupled to the wireless web interface via a radio-frequency signal.

21. An apparatus for providing data transferred on a data network between a host manufacturing computer and a manufacturing tool, and to provide one or more predetermined destinations which have subscribed to receive predetermined process data that is a part of the plurality of current data transferred on a data network between a host manufacturing computer and a manufacturing tool, the apparatus comprising:

a data capture module coupled to the data network, the data capture module configured and arranged to capture the current host or tool data in a first data format;

a translator module coupled to the data capture module and configured and arranged to receive the current host or tool data and to convert the host or tool data from the first data format into a second data format;

a server coupled to the translator module, the server configured and arranged to receive current host or tool data in the second data format from the translator module;

a web interface coupled to the server, the web interface configured and arranged to provide the current or tool data in the second data format in a display format compatible to display the host or tool data on a web-based browser.

22. The apparatus of claim 21 wherein the second data format is XML.

23. The apparatus of claim 21 wherein the display format is an HTML page.

24. The apparatus of claim 21 further comprising a firewall in series between the web interface and the web-based browser.

25. The apparatus of claim 21 further including at least one other manufacturing tool and wherein the server further includes a hardware interface to interface with at least one other manufacturing tool.

26. The apparatus of claim 21 further comprising at least one database coupled to each of the plurality of translation modules, wherein the plurality of current process data in the second data format is stored in the database.

27. The apparatus of claim 26 wherein the plurality of data translation modules is coupled to the at least one database server via a database data network.

28. The apparatus of claim 21 further comprising one or more predetermined subscription destinations that have subscribed to receive predetermined process data that is a part of the plurality of current data transferred on a data network between a host manufacturing computer and a manufacturing tool, wherein the server further includes a publish/subscription module coupled to the web interface, wherein the publish/subscription module provides the predetermined process data to the web interface to be provided to the one or more predetermined subscription destinations via a data network.

29. The apparatus of claim 21 further comprising at least one database coupled to each of the plurality of translation modules, wherein the plurality of current process data in the second data format is stored in the database.

30. The apparatus of claim 29 wherein the plurality of data translation modules is coupled to the at least one database server via a database data network.

31. A method for providing current process data, transferred on a data network between a host manufacturing computer and a manufacturing tool, to a predetermined destination that has subscribed to receive predetermined process data that is portion of the current process data the method comprising:

receiving a current host or tool process data in a first data format;

translating the received current host or tool process data from the first data format to a second data format;

preparing the current host or tool process data to be displayed on a web-based browser;

selecting the portion of the predetermined current host or tool process data corresponding to the subscription destination; and distributing the selected portion of the predetermined process data to the subscription destination.

32. The method of claim 31 further comprising the steps of storing the received current host or tool communication in the second data format in a database.

* * * * *

UNITED STATES PATENT AND TRADEMARK OFFICE
CERTIFICATE OF CORRECTION

PATENT NO. : 6,711,731 B2
DATED : March 23, 2004
INVENTOR(S) : Mitchell Weiss

It is certified that error appears in the above-identified patent and that said Letters Patent is hereby corrected as shown below:

Column 8,
Lines 20-21, "the process" should read -- the predetermined process --;

Column 9,
Line 13, "or tool" should read -- Host or tool --; and

Column 10,
Line 20, "that is portion" should read -- that is a portion --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,711,731 B2
DATED : March 23, 2004
INVENTOR(S) : Mitchell Weiss

Page 1 of 1

It is certified that error appears in the above-identified patent and that said Letters Patent is hereby corrected as shown below:

<u>Title page,</u>
Item [*] Notice, should read -- Subject to any disclaimer, the term of this patent is extended or adjusted under 35 U.S.C. 154 (b) by 80 days --.

Signed and Sealed this

Fifteenth Day of November, 2005

JON W. DUDAS
*Director of the United States Patent and Trademark Office*